United States Patent
Tucker

(10) Patent No.: US 11,308,244 B2
(45) Date of Patent: Apr. 19, 2022

(54) ENABLING ANTI-THEFT MODE FOR A PORTABLE DEVICE

(71) Applicant: Lenovo (Singapore) Pte. Ltd., Singapore (SG)

(72) Inventor: Matthew I. Tucker, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 304 days.

(21) Appl. No.: 16/365,605

(22) Filed: Mar. 26, 2019

(65) Prior Publication Data

US 2020/0311317 A1    Oct. 1, 2020

(51) Int. Cl.
| | |
|---|---|
| G06F 21/88 | (2013.01) |
| G08B 3/10 | (2006.01) |
| G06F 21/31 | (2013.01) |
| G06F 21/81 | (2013.01) |
| G08B 13/14 | (2006.01) |
| G08B 25/10 | (2006.01) |

(52) U.S. Cl.
CPC .............. *G06F 21/88* (2013.01); *G06F 21/31* (2013.01); *G06F 21/81* (2013.01); *G08B 3/10* (2013.01); *G08B 13/1436* (2013.01); *G08B 25/10* (2013.01)

(58) Field of Classification Search
CPC .................................. G06F 21/88; G06F 21/81
See application file for complete search history.

(56) References Cited

U.S. PATENT DOCUMENTS

| | | | | |
|---|---|---|---|---|
| 9,245,434 | B2 * | 1/2016 | Baillargeon | G08B 25/08 |
| 9,344,992 | B2 * | 5/2016 | Noonan | H04W 52/283 |
| 9,369,875 | B1 * | 6/2016 | Mese | H04W 12/06 |
| 9,744,904 | B1 * | 8/2017 | Tolliver | B60Q 9/00 |
| 10,453,322 | B2 * | 10/2019 | Kaindl | G08G 1/005 |
| 10,521,241 | B1 * | 12/2019 | Ha | G06F 21/31 |
| 10,956,624 | B2 * | 3/2021 | Roy | G08B 13/1427 |
| 2006/0152365 | A1 * | 7/2006 | Kim | G06F 21/88 |
| | | | | 340/571 |
| 2008/0079576 | A1 * | 4/2008 | Adapathya | G06F 21/88 |
| | | | | 340/571 |
| 2011/0305337 | A1 * | 12/2011 | Devol | G06F 21/305 |
| | | | | 726/16 |
| 2013/0171971 | A1 * | 7/2013 | Fujii | H04W 12/068 |
| | | | | 455/411 |
| 2013/0295953 | A1 * | 11/2013 | Madsen | G06F 16/13 |
| | | | | 455/456.1 |

(Continued)

OTHER PUBLICATIONS

"This $20 app will set off an alarm if someone tries to steal your MacBook," Team Commercemashable Deals, Mar. 17, 2019, 2 pages.

*Primary Examiner* — Viral S Lakhia
(74) *Attorney, Agent, or Firm* — VanLeeuwen & VanLeeuwen; Jason A. Friday

(57) ABSTRACT

An approach is provided to protect a portable electronic device from use by an unauthorized user. The approach activates an anti-theft system at a stationary portable electronic device. After the system is activated, if a motion of the portable electronic device is detected then the system performs one or more responsive security actions, such as sounding an audible alarm. When the system is activated, the anti-theft system is disabled when valid authentication data is entered by the user at the device.

20 Claims, 7 Drawing Sheets

(56) References Cited

U.S. PATENT DOCUMENTS

| | | | |
|---|---|---|---|
| 2013/0316687 A1* | 11/2013 | Subbaramoo | G06F 1/3231 |
| | | | 455/418 |
| 2014/0009289 A1* | 1/2014 | Berger | G08B 21/00 |
| | | | 340/568.1 |
| 2015/0050945 A1* | 2/2015 | Samuel | H04W 4/029 |
| | | | 455/456.1 |
| 2015/0358790 A1* | 12/2015 | Nasserbakht | G06F 16/128 |
| | | | 455/414.1 |
| 2016/0196432 A1* | 7/2016 | Main | G06F 21/57 |
| | | | 726/1 |
| 2016/0364556 A1* | 12/2016 | Daniel | G06F 21/88 |
| 2017/0013464 A1* | 1/2017 | Fish | H04W 12/06 |

* cited by examiner

ENABLING ANTI-THEFT MODE FOR A PORTABLE DEVICE

BACKGROUND

Portable devices, such as smart phones, tablet computing devices, and laptop computing devices, are able to store large quantities of information that is often personal, confidential, or otherwise valuable to the device owner. In addition, these small devices are often expensive and costly to replace if the device is stolen. Current security of these portable devices largely centers around a code, such as a password, that is entered before a user can access data stored in the device. However, if the device is not in the secure mode (e.g., password protected, etc.), then someone to takes the device from the owner can access the data. In addition, if the device is taken from an area, such as a table, when the owner is not looking, the owner is unaware that the device has been stolen.

Currently a common hardware solution for preventing laptop theft is a physical lock that has a cable that physically secures the laptop to a fixed object in its environment. For example, a laptop could be locked to a table or chair using a such a lock that has a flexible steel or otherwise strong cable that is looped around an object, such as the table or chair, with a special end that is inserted in a slot provided in the laptop. While this traditional approach is a physically strong option, it takes a comparatively long time to deploy. The user needs to pull their lock out of their bag, loop the lock around a fixed object in their environment, insert the other end into the corresponding slot in their laptop, and then lock the lock it with either a key or by a combination lock. This is more time and effort than some people are willing to exert for a quick trip to the restroom or a nearby shelf of books. In addition to the time required for this setup, there are other drawbacks to this traditional physical lock approach. First, in some settings, there are no objects suitable to which to lock the laptop. The object to be locked to must be fixed and have a slot which can accept the end of the lock. Many standard tables, for example, would not work because the cable could just be slid downward and removed below the table leg. Additionally, some devices and laptops do not have the proper slots needed to attach the lock. Some manufacturers avoid including the slot as it is an unsightly visual element that is avoided for appearance reasons and takes away from space that could be used for functional computer elements, such as an extra USB port, etc. This option also requires an additional purchase beyond that of the laptop itself. In addition, some places of business may not appreciate or allow customers to attach the customer's devices to the business' fixtures using locks controlled by the customer.

Another traditional solution for protecting a laptop while leaving it briefly is to ask someone nearby to watch it. This can be awkward, and not all laptop users feel comfortable doing this. This approach is also not secure, because the person asked to watch the laptop may not be trusted to protect the laptop, especially if the person is a stranger. In the event that the owner of the laptop is away for longer than expected, this can put the person asked to watch the laptop in an uncomfortable position if they need to leave before the owner returns.

A third traditional approach involves installing third-party tracking software onto the laptop, which allows the device to be tracked if it is stolen sometimes leading to recovery, or at least disabling or wiping the device clean of personal or confidential data. This option is not a theft deterrent, as it is only a recovery system for when theft of the device has already occurred.

SUMMARY

An approach is provided to protect a portable electronic device from use by an unauthorized user. The approach activates an anti-theft system at a stationary portable electronic device. After the system is activated, if a motion of the portable electronic device is detected then the system performs one or more responsive security actions, such as sounding an audible alarm. When the system is activated, the anti-theft system is disabled when valid authentication data is entered by the user at the device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
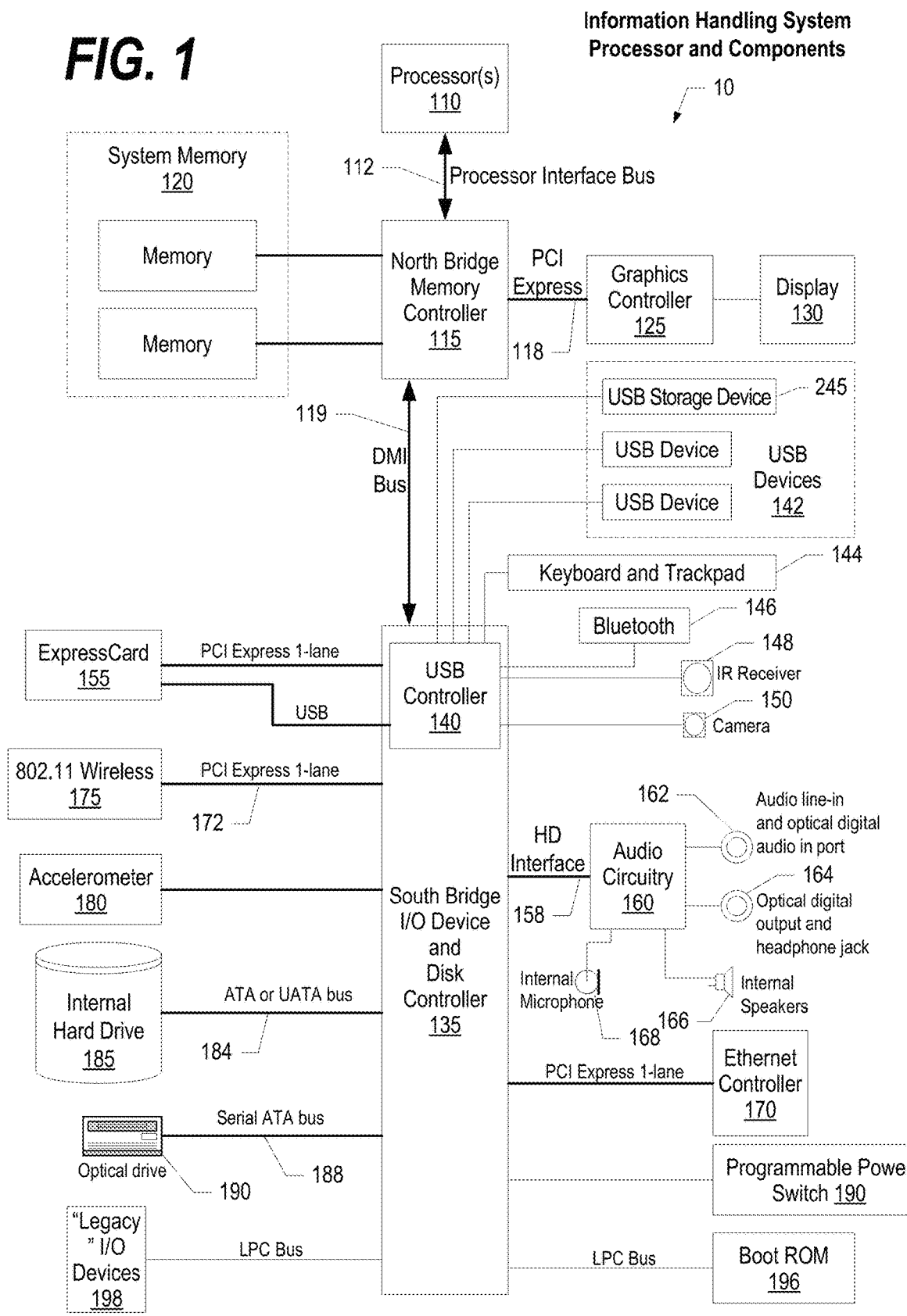
FIG. 1 is a block diagram of a data processing system in which the methods described herein can be implemented.

The accompanying figures describe an approach developed by the inventors to provide motion-triggered laptop theft deterrence. The described motion-triggered laptop theft deterrent approach addresses situations frequently faced by laptop users in which the laptop is left unattended in a public area. This situation occurs frequently in libraries, coffee shops, airports, schools, etc. For example, someone might need to briefly leave their laptop on their table at the library to go find a book on the shelf. Or someone might need to leave their laptop on the table in a coffee shop to visit the bathroom. This situation poses a risk of having the laptop stolen. Even if the laptop is not stolen when left unattended, the user is likely to be uneasy or anxious while away from the laptop, and might be concerned that it will be stolen.

The approach disclosed is a software-based anti-theft system that, in one embodiment, is installed by the manufacturer of the device at the time of manufacture. Alternatively, the approach could be an optional, app-based solution available for customer devices post-purchase. The function of the software implementing the approach is twofold. First, when the user activates the anti-theft system (e.g., via a hotkey combination, on-screen icon, etc.), a large motion graphic appears on the screen of the PC indicating that an anti-theft system is active. The software also blocks all access to other features and options on the computer. Essentially the laptop is locked out of the operating system. This graphic provides an initial deterrent to would-be thieves, who would likely be dissuaded by noticing an anti-theft system in place and active. When the owner returns to their laptop, they simply provide their login credentials (e.g., their Windows login password, a password unique to the anti-theft software, etc.). Alternatively biometric recognition (e.g., face recognition, finger print reader, etc.) could be used to log in the owner when they return. This login disables the anti-theft system until it is manually activated again.

If, while the owner is away and the anti-theft software is activated, a would-be thief approaches and attempts to take the laptop, the onboard accelerometer inside the laptop detects that the laptop is being moved, and the software triggers an alarm sound from the laptop's speakers at max volume. Meanwhile, the screen flashes a warning that whoever is moving the laptop should put it down. This would certainly deter a large portion of would-be laptop thieves and would also alert the user that someone is attempting to steal the device. In addition, the act of picking up a laptop in a public area only to have an alarm sound would look decidedly suspicious and would likely incur questioning from bystanders. The audio coming from the laptop when the system is triggered might also include voice instructions to put the laptop down.

Any time the anti-theft system is active, whether or not the alarm is triggered, the laptop's power button is disabled. So if thieves try to disable the alarm by turning off the laptop, before or after triggering the alarm, they will be unable to. If a thief tried to take out the battery of the laptop to disable the system, they would need to turn the laptop over to access the bottom, which would set off the alarm in the process. The alarm would then be sounding from the moment the thief moved the laptop until they succeeded in removing the battery. For most laptops, the battery is internal and several screws need to be removed before accessing the battery, which provides a long period of alarm sounding to draw unwanted attention to the thief.

An additional feature provided in one embodiment is the ability for the software to send a notification to the owner's mobile phone if the alarm is triggered. The software would also be programmed to not trigger the alarm if someone bumps into the table harmlessly. The distinction between table bumps and attempted theft would be made by determining the direction and duration of motion. An extremely brief horizontal motion (characteristic of the table being bumped) would not trigger the alarm, but horizontal motion of a longer duration (such as the laptop sliding across the table) or any motion vertically or rotation of the laptop would trigger the alarm. In addition, an on-board camera on the device (if available) can be automatically activated to take digital images of the would-be thief and send such images to the user's mobile phone.

Once the alarm is triggered, it continues sounding until either the owner's login credentials are entered, or until the laptop returns to being stationary and a full minute passes. The benefit of this solution over the current options are that it is very easy to implement and arm. Installation would be as simple as a download from the app store. And to arm the alarm, users would only need to hit a hotkey or click an on-screen icon. While it does not make it physically impossible to steal a laptop, it makes doing so in a public area where others are around a very unappealing prospect. And for those who attempt to steal the laptop, the alarm would likely compel them to put the laptop down and walk away, thus preventing the theft. A theft prevented is vastly preferable to successfully recovering a laptop after it's been stolen as data on the device may be compromised.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
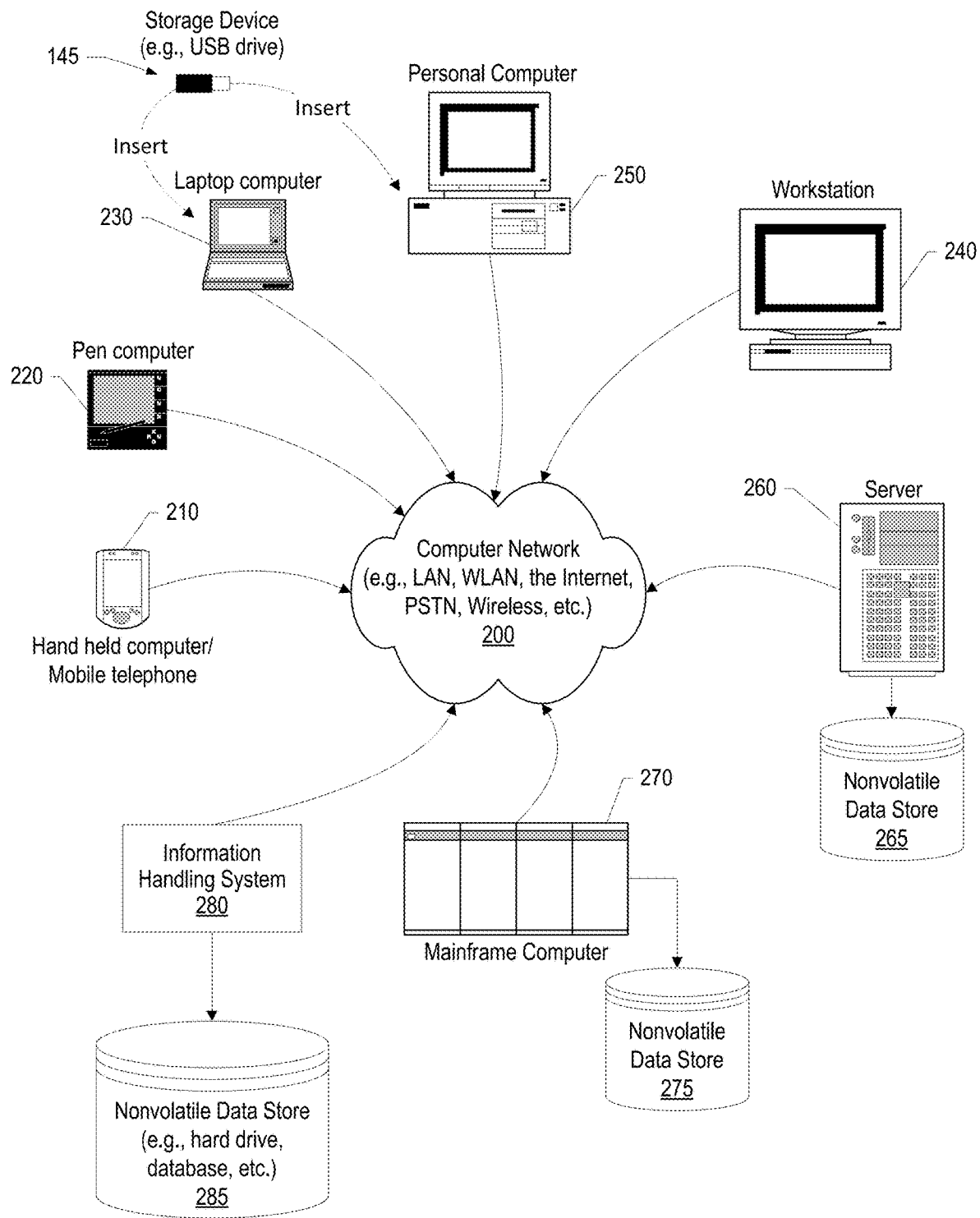
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks. Programmable power switch 190 connects to Southbridge 135 and allows the power switch that provides power to the device to be programmatically disabled so that a person cannot power off the device while the anti-theft system is activated.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
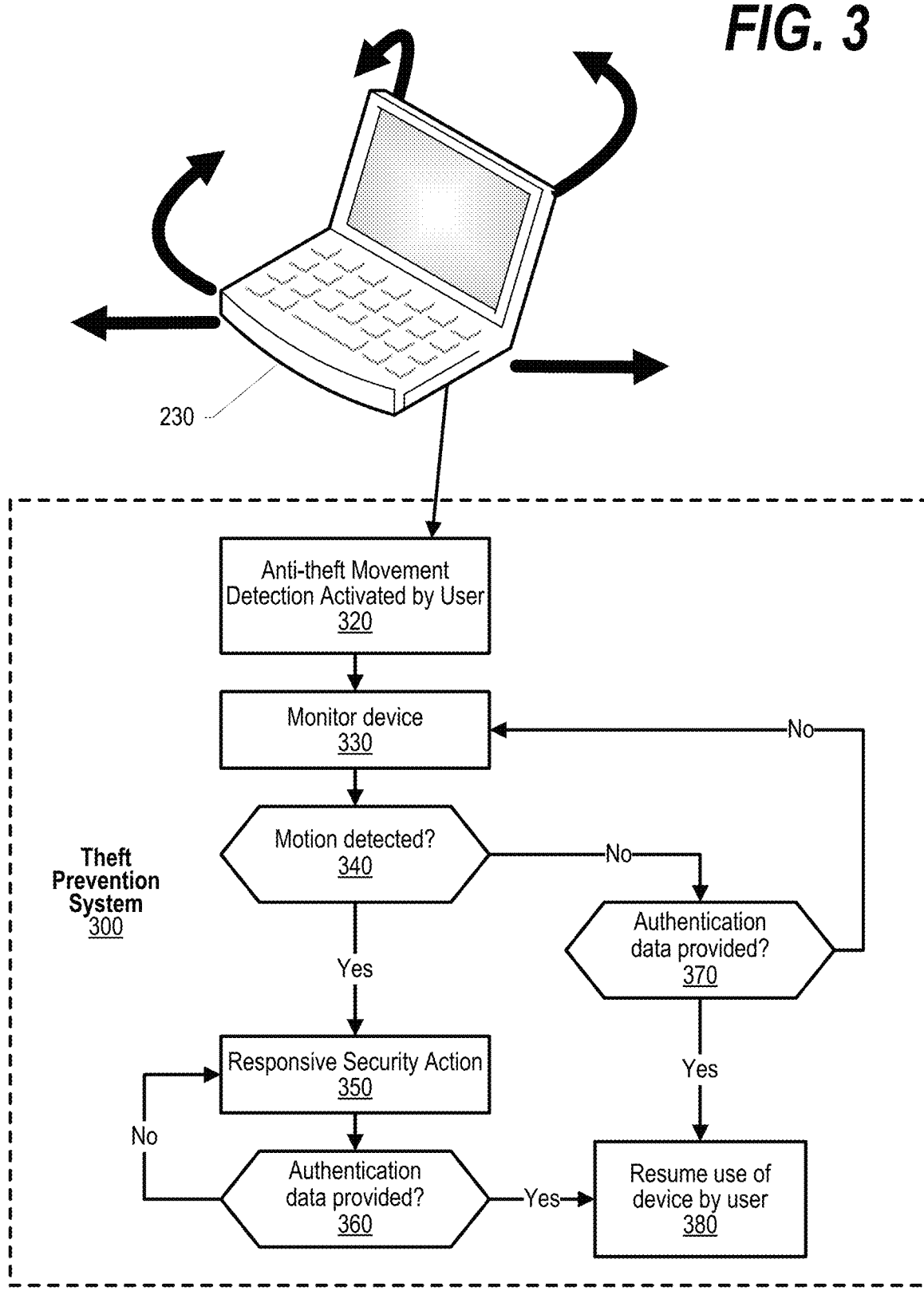
FIG. 3 is a diagram depicting an anti-theft motion detection system deployed on a portable electronic device.

FIG. 3 is a diagram depicting an anti-theft motion detection system deployed on a portable electronic device. Portable electronic device 230, such as a smart phone or other handheld computing device, is equipped with an accelerometer or other technology that detects movement of the device. Theft prevention system 300 operates to prevent the theft of the portable electronic device.

At step 320, the anti-thefts system is activated either by a user or, in one embodiment, automatically such as after the portable electronic device has been idle for a period of time (e.g., ten minutes idle, etc.). At step 330, the process monitors the portable electronic device for movement of the device as detected by an accelerometer included in the device. The process determines as to whether motion is detected at the device while the anti-theft system is activated (decision 340). If motion is detected at the device while the anti-theft system is activated, then decision 340 branches to the 'yes' branch to perform a responsive security action at step 350. On the other hand, if motion is not detected, then decision 340 branches to the 'no' branch bypassing step 350.

When motion of the device is detected while the anti-theft system is activated then, at step 350, the process performs one or more responsive security actions, such as sounding an audible alarm at the device and notifying other devices, such as the user's smart phone, of the alarm via a text message. After the security actions have commenced, security actions such as emitting an audible alarm continue until the user provides authentication data (e.g., a pass code, etc.) at the portable electronic device. The process determines as to whether valid authentication data has been provided (decision 360). If authentication data provided, then decision 360 branches to the 'yes' branch where normal use of the device is resumed at step 380. On the other hand, if valid authentication data is not provided, then decision 360 continues to branches to the 'no' branch which repeatedly loops back to step 350 to continue performing the one or more responsive security actions.

Returning to decision 340, if motion is not detected at the device (decision 340 branching to the 'no' branch), then the process determines whether valid authentication data has been provided at the device (decision 370). If valid authentication data has been provided at the device, then decision 370 branches to the 'yes' branch whereupon, at step 380, the anti-theft system is disabled and normal operation of the device resumes. On the other hand, valid authentication data has been not provided at the device, then decision 370 branches to the 'no' branch which repeatedly loops back to step 330 to continue monitoring the device for movement or for entry of the valid authentication data.

Figure 4:
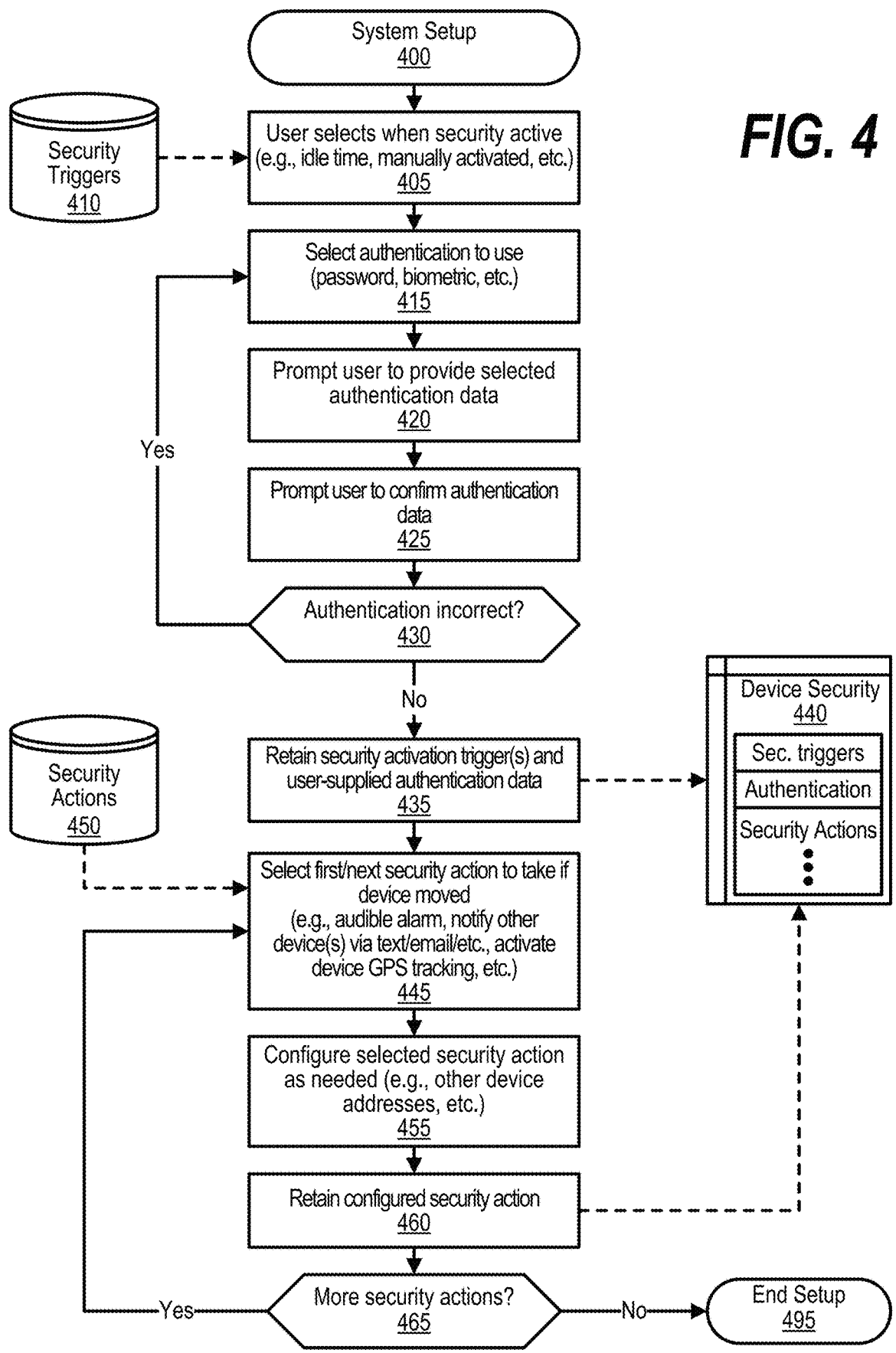
FIG. 4 is a flowchart showing steps taken by a setup process.

FIG. 4 is a flowchart showing steps taken by a setup process. FIG. 4 commences at 400 and shows the steps taken by a process that performs setup processing. At step 405, the users selects when security measures protecting the device should be activated. For example, the user may decide to have the security measures activated when the user has not used the device for some period of time (e.g., five minutes, etc.), when the device has been turned off or manually de-activated by the user, activated by using a manual gesture or action performed by the user on the device, etc. In one embodiment, the security triggers are selected from a list of security triggers that are stored in data store 410.

At step 415, the process has the user select the authentication that is desired to disable the theft prevention system once enabled. Examples of authentication might be a password or pass code, a biometric input (e.g., fingerprint, etc.) or the like. At step 420, the process prompts the user to provide the selected authentication data, such as entering the password or pass code that the user wishes to use or by providing biometric data, etc. if a biometric is being used. At step 425, the process prompts the user to confirm the authentication data, such as re-type a password that was provided, etc. The process determines as to whether the confirmation authentication data does not match the first set of authorization data (decision 430). If the confirmation authentication is incorrect, then decision 430 branches to the 'yes' branch which loops back to step 415 to repeat the process of providing the authorization data. This continues until the confirmation authorization is correct, at which point decision 430 branches to the 'no' branch and processing continues.

At step 435, the process retains the security activation triggers and the user-supplied authentication data in memory area 440. At step 445, the user selects the first security action to take if the device is moved once the theft prevention system has been activated. Security actions might include audible alarms, notify other device(s) via text/email/etc., activating device GPS tracking, etc.). The user selects the security action from a list of available security actions stored in data store 450. At step 455, the process configures the selected security action as needed (e.g., other device addresses for communication, audible alarm levels, etc.). At step 460, the process retains the configured security action in the device's memory area 440 along with the security triggers.

The process determines as to whether the user wants to select and configure more security actions (decision 465). If the user wants to select and configure more security actions, then decision 465 branches to the 'yes' branch which loops back to step 445 to receive and process the user's next security action selection as described above. This looping continues until the user no longer wishes to select and figure more security actions, at which point decision 465 branches to the 'no' branch and setup processing ends at 495.

Figure 5:
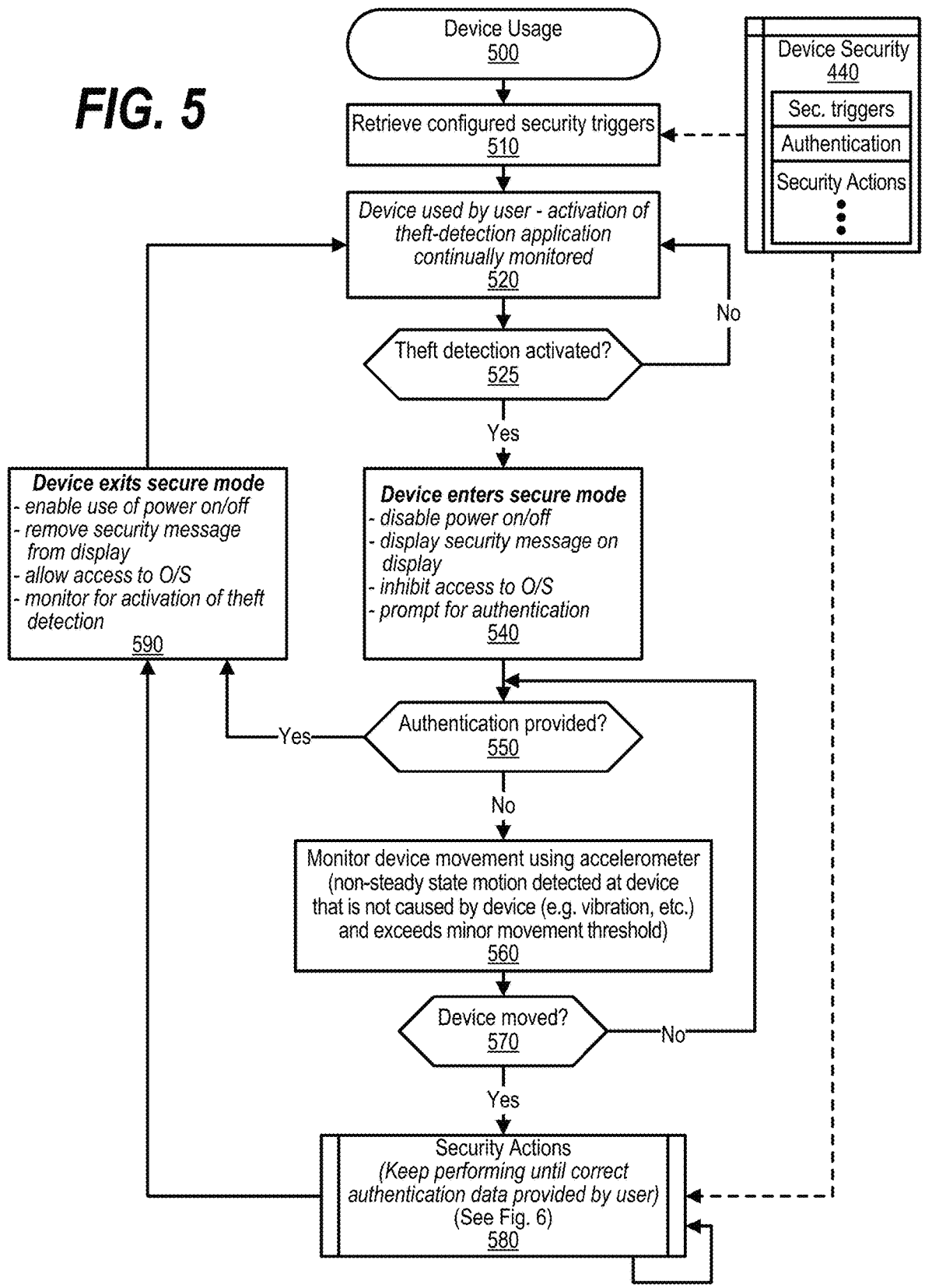
FIG. 5 is a flowchart showing steps taken by a security process during use of the device.

FIG. 5 is a flowchart showing steps taken by a security process during use of the device. FIG. 5 commences at 500 and shows the steps taken by a process that performs device security after the expected motion pattern has been selected as shown in the setup process previously described with respect to FIG. 4. At step 510, the process retrieves the security triggers previously configured for the device as shown in FIG. 4. The security triggers might include an idle time amount, when the device has been turned off or manually de-activated by the user, activated by using a manual gesture or action performed by the user on the device, etc. The security triggers are retrieved from memory area 440.

At step 520, the device is used by the user with activation of the theft-prevention application continually monitored for a triggering event that will start the theft prevention process. The process determines as to whether one of the security settings has been triggered, such as the user manually activating the system (e.g., with a hot-key or otherwise initiating the theft prevention process, due to the amount of idle time exceeding a threshold, etc. (decision 525). If one of the security settings has not been triggered, then decision 525 branches to the 'no' branch which loops back to step 520 to continue monitoring the device for the activation of one of the security triggers. This looping continues until one of the security settings has been triggered, at which point decision 525 branches to the 'yes' branch whereupon, at step 530, the device enters a secure mode.

At step 540, the process devices enters a secure mode with the anti-theft system being activated. While the anti-theft system is active, the system disables the power switch inhibiting a person from manually powering off the device, a security message is displayed on the device's screen warning others that the security system is active and an alarm will sound if the system is moved, and access to the device's operating system is inhibited except for an authentication prompt that is used by the user to enter the authentication data (e.g., password, fingerprint, etc.) to disable the anti-theft system so that the user can resume using the device. The process determines as to whether the user has successfully provided the required authentication data at the device (decision 550). If the user has successfully provided the required authentication data at the device, then decision 550 branches to the 'yes' branch which performs step 590 to disable the anti-theft system and resume normal device operations. On the other hand, if the user has not provided the required authentication data at the device, then decision 550 branches to the 'no' branch to perform steps 560 through 580 to monitor the device for movement and perform security actions when necessary.

At step 560, the process monitors the device for movement using an accelerometer that is included in the device. The monitoring is for non-steady state motion that is detected at the device with such motion not caused by device itself (e.g. small fan vibrations, etc.) and exceeds a minor movement threshold. The process determines as to whether the device has been moved (decision 570). If the device has been moved, then decision 570 branches to the 'yes' branch to perform predefined process 580 that performs the configured security actions as were configured by the user as shown in FIG. 4 (see FIG. 6 and corresponding detailed description for information regarding the security actions that are performed by predefined process 580). Returning to decision 570, if the device has been not moved, then decision 570 branches to the 'no' branch which repeatedly loops back to check for the user's entry of the authentication data or for movement of the device as described above.

Once the user has successfully entered the required authentication data, then decision 550 branches to the 'yes' branch whereupon, at step 590, the process devices exits the secure mode and disables the anti-theft system. When the anti-theft system is disabled, the use of the power switch to power on/off the system is no longer inhibited, the security message is removed from the device's display and the user is allowed access to the operating system. Processing loops back to step 520 to once again monitor for activation of the anti-theft system as previously described.

Figure 6:
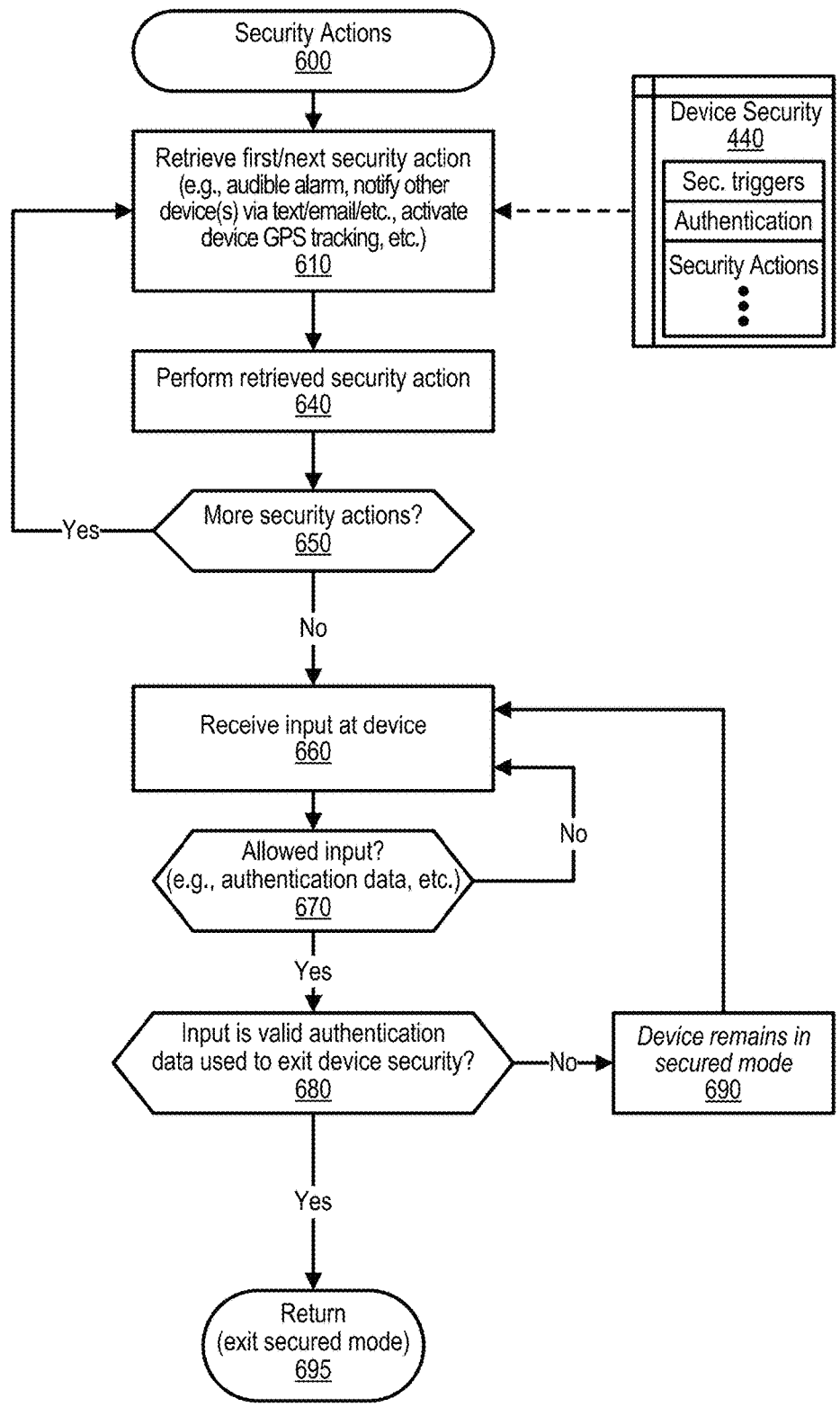
FIG. 6 is a flowchart showing security actions being taken at a device when movement of the device is detected after the anti-theft system has been activated.

FIG. 6 is a flowchart showing security actions being taken at a device when unexpected handling of the device is detected. FIG. 6 commences at 600 and shows the steps taken by a process that performs configured security actions. This routine is called from FIG. 5 when the device detects that it has been moved after the anti-theft system has been activated.

At step 610, the process retrieves the first security action configured by the user from memory area 440. Security actions inhibit use of the device and might also be configured to sound an audible alarm, notify other device(s) via text/email/etc. that the device has been picked up, activate device GPS tracking, and the like. At step 640, the process performs the retrieved security action. The process determines as to whether more security actions were selected and configured during setup processing (decision 650). If more security actions were selected and configured during setup processing, then decision 650 branches to the 'yes' branch which loops back to retrieve and perform the next security action. This looping continues until there are no more security actions to be performed, at which point decision 650 branches to the 'no' branch and processing continues.

At step 660, the process receives an input at device, such as a selection of an emergency call icon or entry of a passcode. The process determines as to whether the input is allowed, such as making an emergency call (decision 670). If the input is allowed, then decision 670 branches to the 'yes' branch whereupon, at step 675, the process performs the allowed function, such as the making of an emergency call. On the other hand, if such input is not allowed, then decision 670 branches to the 'no' branch for further processing. The process determines as to whether the input is the entry of a valid passcode to exit device security (decision 680). If an incorrect passcode is entered, then decision 680 branches to the 'no' branch whereupon processing loops back to step 660 to receive the next input from the current user of the device. During the looping, the performance of any triggered security actions may continue, such as the audible playing of an alarm, tracking of the device using GPS, etc. This looping continues until the valid (correct) passcode is entered by the user, at which point decision 680 branches to the 'yes' branch and processing exits the secured mode of the device and returns to the calling routine (see FIG. 5) at 695.

Figure 7:
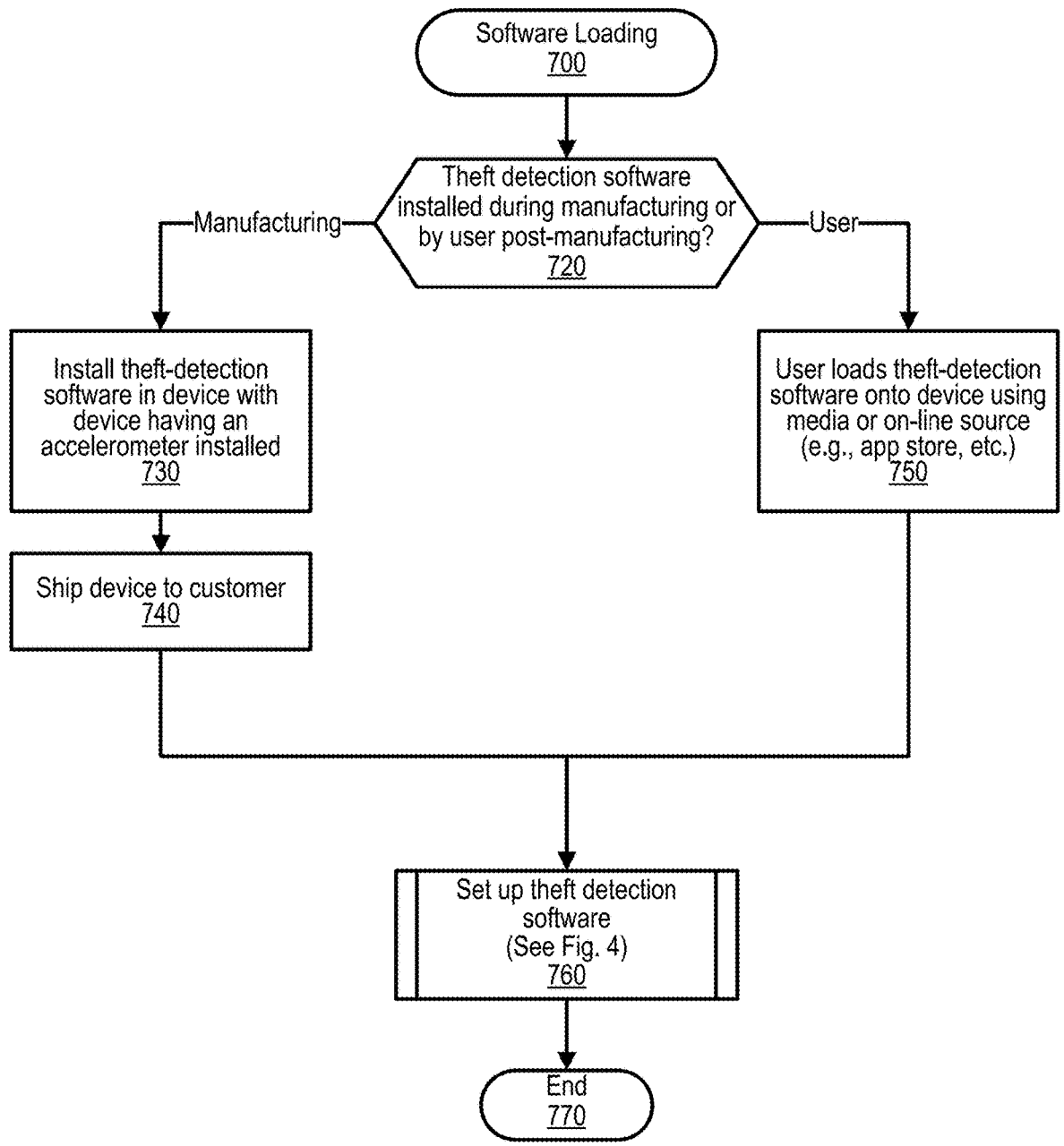
FIG. 7 is a flowchart showing various ways that the the anti-theft system is loaded onto the device.

FIG. 7 is a flowchart showing various ways that the the anti-theft system is loaded onto the device. FIG. 7 commences at 700 and shows the steps taken by a process that loads the anti-theft system onto the device. At least two different approaches are possible. Either, the anti-theft system is loaded on the device during manufacture of the device, or the anti-theft system is loaded on the device by the consumer after the device has been purchased and obtained by the consumer (user). The process determines as to whether the anti-theft software is being installed during manufacturing or by user post-manufacturing (decision 720). If the anti-theft software is being installed during manufacturing, then decision 720 branches to the 'manufacturing' branch to perform steps 730 and 740. On the other hand, if the anti-theft system is being installed by the consumer/user post-manufacturing, then decision 720 branches to the 'user' branch to perform step 750. Steps 730 and 740 are performed when the anti-theft system is installed by the manufacturer. At step 730, the manufacturing process installs the anti-theft system in the device with the manufacturer also installing an an accelerometer in the device. At step 740, the manufacturing process ships the device, already having the anti-theft system installed, to the customer. If the user is installing the anti-theft system post-manufacturing then, at step 750, the user loads the anti-theft system software onto the device using media or an on-line source (e.g., app store, etc.). The user ensures that an accelerometer is installed on the device or installs the accelerometer onto the device. At predefined process 760, the user performs the set up anti-theft system software routine (see FIG. 4 and corresponding text for processing details). FIG. 7 processing thereafter ends at 770.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method comprising:
    activating an anti-theft system at a stationary portable electronic device;
    after the activating:
        disabling an off switch at the portable electronic device;
        in response to detecting a motion of the portable electronic device, performing one or more responsive security actions, wherein one of the responsive security actions is sounding an audible alarm at the portable electronic device, and wherein the portable electronic device cannot be powered off while the anti-theft system is activated; and
        in response to receiving a valid authentication data at the device, deactivating the anti-theft system and enabling use of the off switch, wherein the off switch is usable without entry of a password when the anti-theft system is deactivated.

2. The method of claim 1 wherein activating the anti-theft system further comprises:
    inhibiting access to an operating system running on the portable electronic device.

3. The method of claim 1 wherein activating the anti-theft system further comprises:
    displaying a security message on a display of the portable electronic device.

4. The method of claim 1 wherein the performance of the one or more security actions further comprises:
    transmitting one or more notifications from the portable electronic devices to one or more other devices, wherein at least one of the notifications is a text message transmitted to a portable telephone.

5. The method of claim 1 further comprising:
    installing the anti-theft system on the stationary portable electronic device during a manufacturing process of the portable electronic device, wherein the installing includes installation of an accelerometer on the portable electronic device and further includes installation of a programmable power switch that allows the power switch to be powered on while the anti-theft system is activated on the portable electronic device.

6. The method of claim 1 further comprising:
    automatically performing the anti-theft system activation after detection that the portable electronic device has been idle for a period of time.

7. The method of claim 1 further comprising:
installing a software package that provides the anti-theft system functionality onto the device by a user after receiving the portable electronic device.

8. A portable electronic device comprising:
one or more processors;
an accelerometer accessible by at least one of the processors;
a memory coupled to at least one of the processors; and
a set of instructions stored in the memory and executed by at least one of the processors to:
activate an anti-theft system at the portable electronic device;
after the activation of the anti-theft system:
disabling an off switch at the portable electronic device;
in response to detecting a motion of the portable electronic device, performing one or more responsive security actions, wherein one of the responsive security actions is emitting an audible alarm at the portable electronic device, and wherein the portable electronic device cannot be powered off while the anti-theft system is activated; and
in response to receiving a valid authentication data at the device, deactivating the anti-theft system and enabling use of the off switch, wherein the off switch is usable without entry of a password when the anti-theft system is deactivated.

9. The portable electronic device of claim 8 wherein activating the anti-theft system further comprises:
inhibiting access to an operating system running on the portable electronic device.

10. The portable electronic device of claim 8 wherein the activation of the anti-theft system further comprises:
display of a security message on a display of the portable electronic device.

11. The portable electronic device of claim 8 wherein the performance of the one or more security actions further comprises:
transmit one or more notifications from the portable electronic devices to one or more other devices, wherein at least one of the notifications is a text message transmitted to a portable telephone.

12. The portable electronic device of claim 8 further comprising:
installation of the anti-theft system on the stationary portable electronic device during a manufacturing process of the portable electronic device, wherein the installing includes installation of an accelerometer on the portable electronic device and further includes installation of a programmable power switch that allows the power switch to be powered on while the anti-theft system is activated on the portable electronic device.

13. The portable electronic device of claim 8 further comprising:
automatically perform the anti-theft system activation after detection that the portable electronic device has been idle for a period of time.

14. The portable electronic device of claim 8 further comprising:
installation of a software package that provides the anti-theft system functionality onto the device by a user after receiving the portable electronic device.

15. A computer program product comprising:
a computer readable storage medium comprising a set of computer instructions, the computer instructions effective to:
activate an anti-theft system at the portable electronic device;
after the activation of the anti-theft system:
disabling an off switch at the portable electronic device;
in response to detecting a motion of the portable electronic device, performing one or more responsive security actions, wherein one of the responsive security actions is sounding an audible alarm at the portable electronic device, and wherein the portable electronic device cannot be powered off while the anti-theft system is activated; and
in response to receiving a valid authentication data at the device, deactivating the anti-theft system and enabling use of the off switch, wherein the off switch is usable without entry of a password when the anti-theft system is deactivated.

16. The computer program product of claim 15 wherein activating the anti-theft system further comprises:
inhibiting access to an operating system running on the portable electronic device.

17. The computer program product of claim 15 wherein the activation of the anti-theft system further comprises:
display of a security message on a display of the portable electronic device.

18. The computer program product of claim 15 wherein the performance of the one or more security actions further comprises:
transmit one or more notifications from the portable electronic devices to one or more other devices, wherein at least one of the notifications is a text message transmitted to a portable telephone.

19. The computer program product of claim 15 further comprising:
installation of the anti-theft system on the stationary portable electronic device during a manufacturing process of the portable electronic device, wherein the installing includes installation of an accelerometer on the portable electronic device and further includes installation of a programmable power switch that allows the power switch to be powered on while the anti-theft system is activated on the portable electronic device.

20. The computer program product of claim 15 further comprising:
automatically perform the anti-theft system activation after detection that the portable electronic device has been idle for a period of time.

* * * * *